D. Kidder,
Shutter Worker.
No. 91,026.  Patented June 8, 1869.
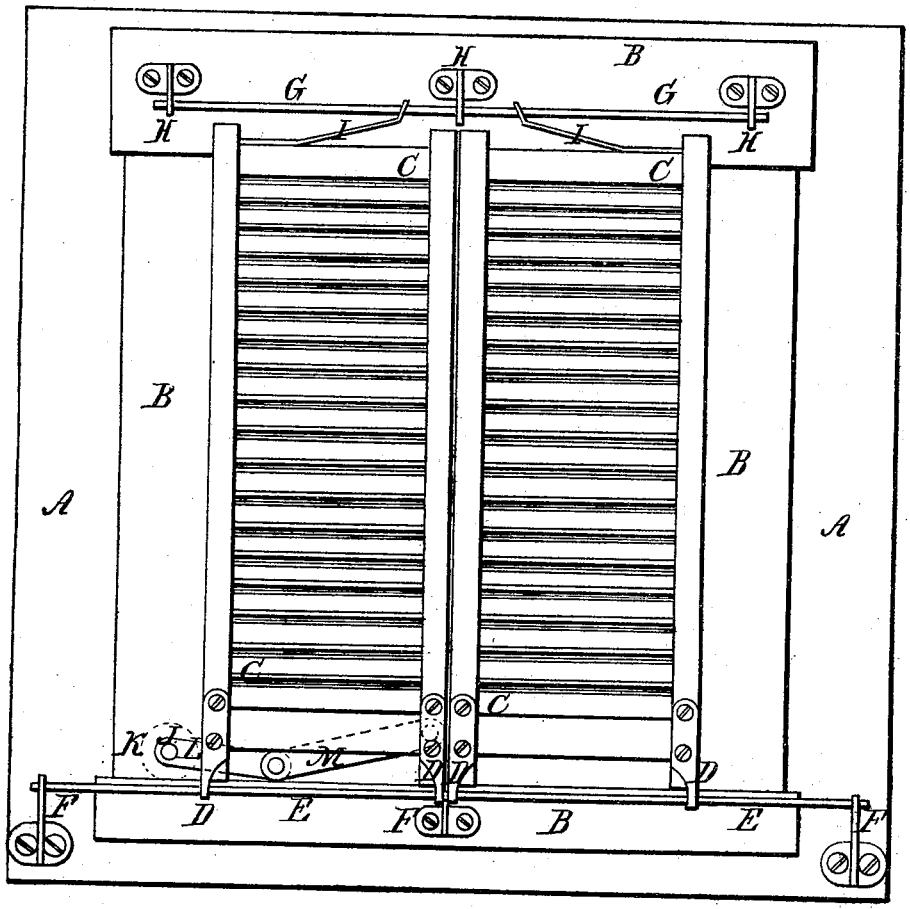
Witnesses
Inventor
D Kidder

United States Patent Office.

DANIEL KIDDER, OF FRANKLIN, NEW HAMPSHIRE.

Letters Patent No. 91,026, dated June 8, 1869.

IMPROVED SHUTTER-WORKER.

The Schedule referred to in these Letters Patent and making part of the same.

*To all whom it may concern:*

Be it known that I, DANIEL KIDDER, of Franklin, in the county of Merrimack, and State of New Hampshire, have invented a new and useful Improvement in Hanging Window-Blinds; and I do hereby declare that the following is a full, clear, and exact description thereof, which will enable others skilled in the art to make and use the same, reference being had to the accompanying drawing, forming part of this specification.

The figure is a view of a pair of window-blinds, to which my improvement has been attached.

My invention has for its object to improve the manner of hanging and operating window-blinds, so as to make them safer and more conveniently operated than the blinds hung and operated in the ordinary manner; and It consists in the means for hanging and operating the blinds, as hereinafter more fully described.

A represents the side of the building;

B is the window-frame; and

C are the blinds.

To the lower ends of the blinds C are attached ears D, through which passes a rod, E, attached to and supported by three brackets F, the end ones being attached to the wall of the building, and the middle one to the centre of the window-sill, the rod E being made of such a length that the blinds C may be slid along it away from before the window.

Above the upper ends of the blinds C is placed another rod, G, attached to and supported by brackets H, secured to the window-frame.

I are springs, the lower ends of which are secured to the upper edges of the blinds C, and the upper ends of which have holes formed through them, through which passes the rod G. This construction and arrangement of the springs I holds the blinds securely down upon the rod E, and, at the same time, prevents the upper ends of the blinds from becoming detached, and allowing the blinds to fall down and be broken.

J is a shaft passing through the lower part of the sides of the window-frame B, and to the inner end of which is attached a knob, K, as shown in dotted lines in the figure, which said knob may also serve as a curtain-knob.

To the outer end of the shaft J is attached one end of an arm, L, to the other end of which is pivoted one end of a bar, M, the other end of which is pivoted to the lower part of the blind C, near its forward edge, as shown in the drawing, so that by revolving the shaft J, by means of the knob K, the blind C may be slid back and forward.

The crank-arm L and bar M are made of such a length, that when the blind is pushed fully forward, the joint between the arm L and bar M may drop below the horizontal line, and thus lock the blind shut. The blind, when fully open, is locked in the same way, so that the blinds can neither be opened nor closed without operating the shaft J.

I claim as new, and desire to secure by Letters Patent—

The combination and arrangement of the shaft J, arm L, and pivoted bar M, with the blind C, substantially as herein shown and described, and for the purpose set forth.

DANIEL KIDDER.

Witnesses:
WALTER AIKEN,
PARKER C. HANCOCK.